United States Patent [19]

Kiefer et al.

[11] Patent Number: 4,516,999
[45] Date of Patent: May 14, 1985

[54] PROCESS FOR THE THERMAL TEMPERING OF GLASS

[75] Inventors: Werner Kiefer, Mainz; Klaus Stetter, Möhrendorf, both of Fed. Rep. of Germany

[73] Assignee: JENAer Glaswerk, Schott & Gen., Mainz, Fed. Rep. of Germany

[21] Appl. No.: 383,938

[22] Filed: Jun. 1, 1982

Related U.S. Application Data

[63] Continuation of Ser. No. 226,845, Jan. 21, 1981, abandoned.

[30] Foreign Application Priority Data

Jan. 21, 1980 [DE] Fed. Rep. of Germany ....... 3001944

[51] Int. Cl.³ .............................................. C03B 27/02
[52] U.S. Cl. ......................................... 65/116; 65/114
[58] Field of Search .................................. 65/114, 116

[56] References Cited

U.S. PATENT DOCUMENTS

| | | | |
|---|---|---|---|
| 3,186,816 | 6/1965 | Wartenberg | 65/116 |
| 3,706,544 | 12/1972 | Michalik | 65/116 |
| 3,802,860 | 4/1974 | Gorman | 65/116 |

FOREIGN PATENT DOCUMENTS 861886  11/1940  France ................. 65/116

Primary Examiner—Arthur D. Kellogg
Attorney, Agent, or Firm—Quaintance & Murphy

[57] ABSTRACT

A process for the thermal tempering of glass wherein the hot glass is immersed in a vessel in which there are two mutually immiscible liquids. The liquid of lower density is above the liquid of higher density. The glass is precooled for a specific time in the liquid of lower density and then is brought into the liquid of higher density.

7 Claims, 3 Drawing Figures

PROCESS FOR THE THERMAL TEMPERING OF GLASS

This application is a continuation of U.S. application Ser. No. 226,845, filed Jan. 21, 1981 now abandoned.

DESCRIPTION

This invention relates to a process for the tempering of glass.

The thermal tempering of glass is known to comprise a heating process and a cooling process.

In the case of glass sheets, the heating can be conducted with the glass either vertical or horizontal. The maximum heating temperature is limited by the deformation of the sheet. For the most part, it lies under the softening temperature of the glass ($10^{6.6}$ Pa×s) and is generally lower than the temperature for a glass viscosity of $10^8$ Pa×s. The minimum heating temperature is limited by the desired degree of tempering and by the production of cracks. With increasing heating temperature, the tempering rises to a saturation value. If the heating temperature is too low, then cracks can occur in the surface of the glass during the quenching process.

Horizontal heating ovens have the advantage that they achieve a high throughput with limited personnel requirements. Furthermore, the glass sheets have no gripper impressions which would constitute points of mechanical weakness.

Blowing compressed air is sufficient for the tempering of glass which has a thermal stress coefficient equal to or greater than 0.5 N/(mm²K) and a thickness equal to or greater than 5 mm. The thermal stress coefficient ($\rho$) is given by the equation:

$$\rho = \alpha \cdot E/(1-\mu) \; N/(mm^2 K),$$

wherein:

$\alpha$ is the linear coefficient of thermal expansion ($K^{-1}$) between 20° and 300° C.; and E is the elastic modulus (N/mm²); and $\mu$ is the Poisson's number of the glass. For glasses with a wall thickness of less than 5 mm or a thermal stress coefficient less than 0.5 N/(mm²K), it is not possible to reach the desired level of tempering by quenching in air.

A large number of tempering processes have been developed especially for the tempering of thin (0.5 to 3.5 mm) sodium silicate glass for which the value of $\alpha$ is normally about $8.5 \cdot 10^{-6} K^{-1}$ when measured between 20° and 300° C. For example, the glass can be sprayed with a liquid or immersed in a liquid in order to achieve rapid cooling. Organic liquids are preferably employed for spraying as well as immersion. In U.S. Pat. No. 3,186,816, it is taught that water, methanol, glycol, and glycerine are suitable as quenching fluids because during the process the self created vapor layer and not the surrounding liquid is the effective quenching agent. When water is used, the self generated water vapor mantle is not maintained for a sufficient period to sufficiently cool the glass to withstand direct contact with the water. In the case of quenching by immersion, mixtures of two organic liquids have been employed to increase the tempering. See German Offenlegungschrift No. 1,596,712.

The tempering of glass having a thermal stress coefficient of from 0.2 to 0.5 N/mm²K) in minerals oils and melted salts has been attempted.[1] Crack-free samples are obtainable only by heating to temperatures in the vicinity of the softening temperature or above the softening temperature. These high heating temperatures are impractical because of the danger of deformation.

1. Gora, P., Kiefer W., Sack W. and Seidel H.: "Thermisches Vorspannen von Spezialgläsern durch Abschrecken in Mineralölen und geschmolzenen Salzen", Glastechn. Ber. 50 (1977), Number 12; Pages 319-327.

The production of cracks during tempering in liquids frequently occurs at the edge of the glass plate which is first immersed in the liquid. This is attributed to hydrodynamic processes at the edge. See German Offenlegungschrift No. 2,238,645.

Next to immersion in liquid, spraying with liquid is employed. Organic liquids are primarily employed for this purpose. When water is the material sprayed, surface cracks appear or the glass explodes because of the resultant rapid cooling effect. Cracks can be avoided only if the water is applied to the surface of the glass in a finely divided condition and in a limited amount.

Processes are also known in which blowing with air (German Democratic Republic Pat. No. 74,326) or spraying with a liquid U.S. Pat. No. 3,706,544) for precooling is accomplished before the final quenching in an organic liquid takes place.

With the previously described processes, it it not possible to provide thin (5 mm) glass having a low thermal stress coefficient (less than 0.5 N/(mm²K) with a sufficiently high tempering such that it breaks into fine grains upon mechanical destruction. However, an increasing need has arisen for just such tempered glasses. Such glass can be employed, for example, in fireproof glasings since they not only possess the properties of fire resistance according to German Industrial Standard (DIN) 4102 but also possess the properties of safety glasses.

It is an object of the present invention to provide a process for the high thermal tempering of glasses that can also be employed for thin glasses having a low thermal stress coefficient.

It has now been found, contrary to the teachings of the prior art, that such thin glasses and glasses with a low thermal stress coefficient ($\rho \leq 0.5$ N/(mm²K)) can be highly thermally tempered by immersion in water if the glass is precooled for a short time in a supernatent organic liquid.

According to the process of the present invention, glass sheets can be heated in either the vertical or horizontal position. In the case of vertical heating, it is not absolutely necessary that pointed grippers be employed since the grippers can be released prior to the immersion.

The invention may be better understood by reference to the following drawings wherein:

FIG. 1 is a sectional view of an apparatus suitable for practicing the process of the present invention which apparatus is especially useful with ovens wherein the glass is held vertically, and wherein FIG. 2 is a sectional view of an apparatus useful for practicing the process of the present invention which is especially useful in connection with ovens wherein the glass is held in the horizontal position; and wherein FIG. 3 is a sectional view of still another apparatus useful for practicing the process of the present invention.

In the case of a vertical heating, the immersion bath can be raised or the sheets can be lowered. In these cases, the immersion bath can be arranged next to the oven as well as under the last heating chamber of the oven. The residence time of the glass in the liquid of lower density can be controlled by the velocity at which the glass is lowered and by the depth of the liquid of lower density.

In the case of a horizontal heating, the hardening bath is found connected to the oven. The plates can, for example, be transferred by means of rollers through the medium of lower density into the medium of higher density. The angle of descent and the height of the liquid of lower density determines the residence time in the liquid of lower density.

Surface cracks which are produced because of rubbing of the glass surface on the transport rolls during rapid removal of the plate from the oven can be avoided since the speed of the rollers is adjusted to the angle of descent.

The upper part of the immersion bath can be divided into an input and an output part. The liquid of lower density is located only in the input part. The liquid of higher density can be covered with a layer of specifically removable, immiscible liquid useful for cleaning of the plates.

The process of the present invention is based on the fact that the liquid of higher density has a higher heat transfer between glass and liquid than the liquid with the lower density.

As liquids of higher density, water or aqueous solution are preferably employed.

As liquids of lower density, organic liquids such as, for example, commercially available hardening oils or silicone oils are preferably employed. The liquid of lower density preferably has a density less than one gram per cubic centimeter.

The capability of organic liquids such as, for example, hardening oils is known from the patent literature. In the case of organic liquids, the maximum temperature difference that can be produced is generally dependent upon the temperature of the glass, the thickness of the glass, as well as the temperature of the liquid, the viscosity of the liquid, the density of the liquid and the thermal conductivity of the liquid. The effectiveness of the oil can be increased by the addition of volatile organic liquids. Organic liquids of different compositions can be employed.

According to the present invention, such supplemental materials are possible as long as they are not greatly soluble in the liquid of higher density.

The liquid of higher density, such as, for example, water, can likewise be mixed with organic solvents. These organic solvents must be soluble in the liquid of higher density but not in the liquid of lower density. These organic solvents should have a boiling point lower than the liquid of higher density. By means of the admixture of the organic solvents, the heat removed in the liquid of higher density is reduced and thereby moderated. Examples of suitable organic solvents include, among others, methanol, ethanol, glycerol and higher water soluble polyols.

It is useful to pass both liquids in two separate streams through recycling plants provided with suitable filters and heat exchanges in order to remove thermal degradation products from the oil and in order to maintain the temperature of the bath constant. The bath can be provided with an inert gas blanket in order to protect the liquid of lower density.

An important advantage of the claimed process exists in that a multitude of parameters are available for control.

In addition to the known parameters of the organic specific light liquid, such as temperature, viscosity, evaporation of volatile components, other parameters can be controlled according to the claimed process. These other parameters include the residence time in the liquid of lower density and the creation of an enveloping vapor layer by means of the addition of volatile liquids to the liquid of higher density.

Because of these parameters, the heat removal during quenching can be better controlled, thereby producing a sensibly higher tempering.

Even articles of glass which are only 2 to 3 mm thick and have a thermal stress coefficient of $0.25 \text{ N}/(\text{mm}^2\text{K})$ can be provided with such a high tempering that upon mechanical destruction they break into fine grains.

The claimed process can be employed for the thermal tempering of thin blown glasses. In this case, the glass is filled with the liquid of lower density and is lowered into the liquid of higher density.

A further advantage of the process lies in its easy technological handling.

Up to now, volatile liquids such as $CCl_4$, for example, were required in the oil bath for the tempering of thin glasses. According to the present invention, the use of these sometimes poisonous volatile liquids can be avoided.

It is once more mentioned that the admixture of volatile liquids is basically possible in claimed process but is not necessary in most cases.

An important advantage of the process of the present invention is the limited manufacturing costs which follow because of heat removal by means of oil and water.

Although the reactions which each occur in the process of the present invention are not completely explained, the positive occurrence of the tempering process permits the following postulations: two processes are to be observed during thermal tempering. First is the production of the highest degree of tempering. Second is the avoidance of cracks in the surface of the glass. For any given glass, the degree of tempering increases with increasing temperature differences ($\Delta T$) between the surface of the glass and the glass core up to the point where the glass core reaches the solidification temperature. According to the speed of the cooling process, this solidification temperature lies very slightly above the glass transformation temperature according to German Industrial Standard (DIN) No. 52324. As used herein, the term "solidification temperature" means "einfriertemperatur" in DIN 52324.

The tendency for the creation of cracks is greater the higher the termperature difference ($\Delta T$) is between the surface of the glass and the core of the glass and even increases after the surface of the glass passes the transformation temperature.

In order to eliminate cracks, it is advantageous to produce the greatest temperature difference between the glass surface and the glass core *before* the glass surface reaches the solidification temperature because this temperature difference does not cause any appreciable strain in the glass surface. This temperature difference increases in proportion to the temperature difference between the transformation temperature and the heating temperature, and increases in proportion to the rapidity of cooling of the glass surface compared to the glass core. In general, the temperature at which the glass article deforms represents the upper limit of the heating temperature.

From the standpoint of tempering, the maximum temperature difference between the surface layer and the glass core should be maintained if the glass core reaches the transformation temperature. A further increase of the temperature difference after the glass core has reached the transformation temperature causes no further increase in the tempering. It does, however, strongly reduce the production of cracks. If the heating temperature is raised in order to avoid the production of cracks, then the maximum temperature difference between the glass surface and the glass core will already be surpassed before the glass core reaches the transformation temperature.

In the following observations, oil is assumed to be the liquid of lower density for purposes of simplicity, and water is assumed to be the liquid of higher density.

During quenching of hot glass in water, a vapor mantle is first created. This vapor mantle hinders a rapid cooling of the glass. As soon as the heat transfer from the glass core is insufficient to maintain the vapor mantle, the vapor mantle collapses and the glass cools very rapidly. The maximum temperature difference between the glass surface and the glass core is first reached if the glass core is cooled below the transformation temperature. In other words, the temperature difference between the glass surface and the glass core rapidly increases when the surface of the glass has passed the transformation temperature.

When glass is immersed in oil, the heat is evenly removed. In other words, the temperature difference passes through a maximum and then subsides. The maximum temperature difference that can be produced is dependent upon the heating temperature, the thickness of the glass, the temperature of the oil, and the oil itself. In the case that the oil in the vicinity of the glass surface is rapidly heated, the heat removal is insufficient to highly temper, extremely thin glass having a thickness of equal to or less than 2 mm or glass with a low thermal stress coefficient.

According to the present invention, the heat in the glass is first removed by immersion in oil. As soon as the oil in the vicinity of the glass surface begins to be warmed and slows the heat removal, the glass is transferred to the water which is immediately below the oil. A rapid heat removal follows in the water. Since the glass has already had heat removed in the oil, no closed water vapor mantle is created on the glass surface which otherwise could hinder the rapid heat removal.

Use is made in the process of the present invention of the existence of severe heat removal from hot glass in oil and from somewhat colder glass in water. In this manner, the process can be employed to quench a glass body and produce a higher temperature difference between the surface and the glass core than is possible by immersion in oil alone. Compared to the immersion in water alone, the present invention has the advantage that the maximum temperature difference will be reached before or if the glass core reaches the transformation temperature.

According to the process of the present invention, thin glass having a thickness less than 1 mm and having a high thermal high stress coefficient ($\rho \geq 0.5$) can also be tempered. It has been shown that in this case it is advantageous to leave the glass in the oil for a somewhat longer period (greater than two seconds) before it is immersed in the water.

If a thin glass is heated to the highest possible temperature without the production of cracks and subsequently rapidly quenched, then the maximum temperature difference between the surface and the glass core will be reached before transformation of the glass core. When the transformation temperature is reached, the maximum temperature difference has already been exceeded and the surface exhibits reduced tempering. However, if the glass is transferred from the organic liquid into the water just before the glass core reaches the transformation temperature, then the temperature difference passes through a second maximum if the glass core reaches the transformation temperature. The tensile stress at the surface of the glass passes through two maxima as does the temperature difference.

Whereupon, since the glass is first immersed in the organic liquid, the edge which is first immersed does not remove so much heat as is the case when it is immersed in water such that the creation of a vapor mantle would be the case. Furthermore, a thin organic liquid film remains on the glass surface when the glass is immersed in the water. This organic liquid film appears to inhibit a too rapid heat removal. This supposition is further supported since high viscosity organic liquids exhibit fewer cracks in the surface.

In general, the process of the present invention is applicable to a wide variety of glasses of various forms and dimensions. The process is especially advantageous when applied to borosilicate glass having a thickness of 1 to 8 millimeters and when applied to float glass having a thickness of 1 to 4 millimeters.

The heating of the glass is conducted for a time until the glass has a temperature above the glass transformation temperature and below the softening temperature. These temperatures are well known in the art for the particular glass employed. In the case of borosilicate glass, heating to 700° to 780° C. has been found effective. In the case of float glass, 650° to 730° C. has been found effective.

In accordance with the present invention, a wide variety of oils can be employed according to the present invention as long as they have a density less than that of the liquid of higher density and as long as they are immisible with the liquid of higher density. Suitable hydrocarbon oils are described in Michalik U.S. Pat. No. 3,706,544 in Col. 8 at Lines 27-49 inclusive. Suitable silicone oils are also described in Michalik beginning at Col, 7, Line 43 and ending at Col. 8, Line 26. The cited portions of the Michalik patent are incorporated herein as fully and completely as if reproduced in full at this point.

The temperatures of the liquids can vary greatly and have been found not to play an important role in the invention. Thus it is possible to employ liquids at temperatures only slightly above their freezing point and only slightly below their boiling point. When water is the liquid of lower density, temperatures between zero and 100° C. are suitable whereas temperatures between 10° and 40° C. are preferred because of convenience.

The residence time of a particular point on the surface of the heated glass in the liquid of lower density is critical to the practice of the present invention. A given point on the surface of the heated glass must remain in the liquid of lower density long enough such that the glass does not crack upon entering the liquid of higher density but not so long as to completely cool the glass. In the case of float glass, residence times of 2 to 5 seconds have been found suitable. On the other hand, in the case of borosilicate glass, residence times of 0.5 to 3 seconds have been found suitable.

DESCRIPTION OF FIGURES

The invention may be better understood by referring to FIG. 1 which shows an apparatus 10 suitable for practicing the process of the present invention. The apparatus 10 is especially useful when a glass sheet is to be heated in the vertical position. The apparatus 10 comprises an oven 12 and a vessel 14. The oven 12 has walls 16 defining a slit 18. The oven 12 can be heated by any suitable means such as a resistance heater 20 in series with a generator 22 and a switch 24. The vessel 14 is placed below the oven 12 and is adapted to receive the heated glass sheet 26 as the glass sheet 26 passes through the slit 18. The vessel 14 is adapted to contain a liquid 28 of lower density above a liquid 30 of higher density.

In operation, the glass sheet 26 is heated to the desired temperature in the oven 12 whereupon it is rapidly passed through the slit 18 and into the liquid 28 of lower density. The glass sheet 26 passes through the liquid 28 of lower density and into the liquid 30 of higher density.

Figure 1:
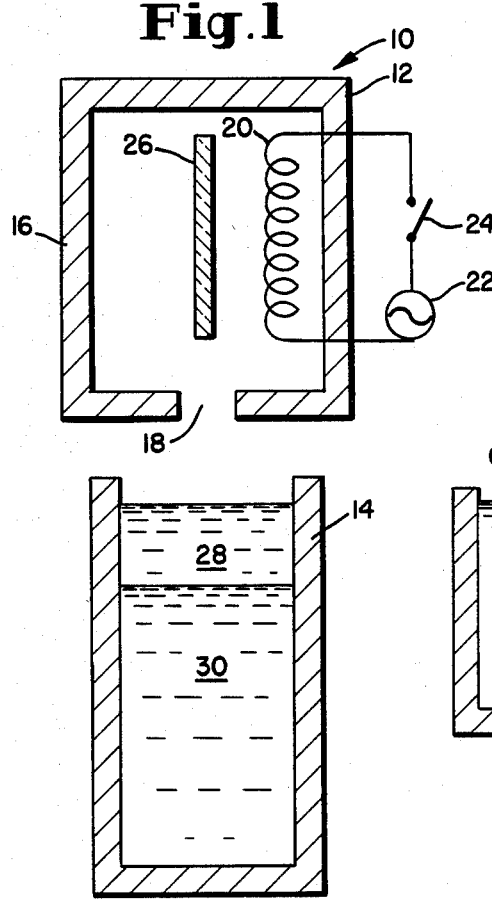
Figure 3:
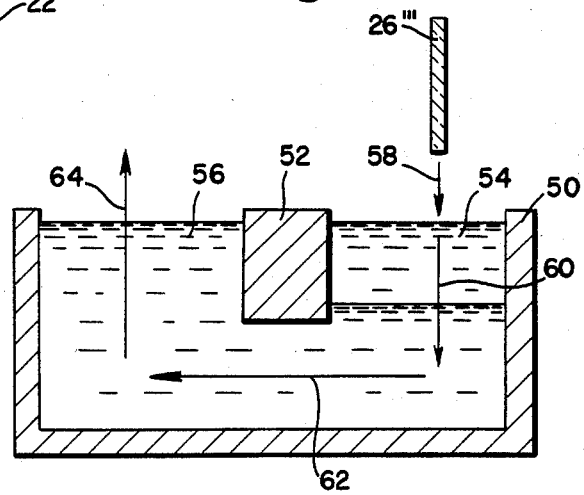
Referring now to FIG. 3, there is shown a vessel 50 with parallel side walls (not shown). Extending between the parallel side walls (not shown) is a barrier 52. The vessel 50 contains a liquid 54 of lower density and a liquid 56 of higher density. The height of the barrier 52 is greater than the height of the liquid 54 of lower density such that the barrier 52 prevents the liquid 54 of lower density from extending entirely across the vessel 50 and in fact contains the liquid 54 of lower density between the vessel 50 and the barrier 52. In practice, a glass sheet 26''' passes in the direction of the arrow 58 into the liquid 54 of lower density. The glass sheet 26''' follows the route shown respectively by the arrows 58, 60, 62, and 64.
Figure 2:
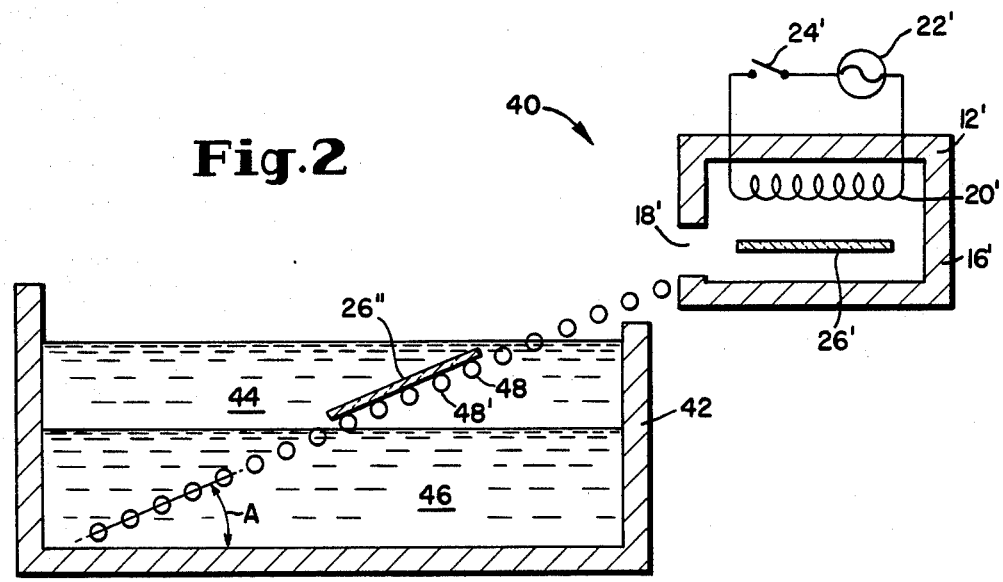
Referring now to FIG. 2, there is shown an apparatus 40 for practicing the process of the present invention. The apparatus 40 is especially useful when employed with an oven adapted to heat a glass sheet while the glass sheet is held in the horizontal position. The oven 12' has walls 16' defining a slit 18', and has a resistance 20' in series with a generator 22' and a switch 24', the purpose and function of which is exactly as described above with respect to FIG. 1. The apparatus 40 is provided with a vessel 42 adapted to contain a liquid 44 of lower density and a liquid 46 of higher density. A series of rollers represented by the rollers 48, 48' are positioned with respect to one another to provide a gliding path for the glass sheet 26' as the glass sheet 26' leaves the oven 12' and enters the vessel 42. The angle of descent is the angle "A" which the angle between the horizontal and the line of the rollers 48, 48'. In operation, the glass plate 26' is heated in the oven 12' to the desired temperature whereupon it exits through the slit 18' and contacts the rollers 48, 48' in the liquid 44 of lower density in the position shown by the plate 26''. The plate 26'' then leaves the liquid 44 of lower density and enters the liquid 46 of higher density. In a preferred embodiment of the present invention, the glass sheet 26'' passes through the liquid 44 of lower density and into the liquid 46 of higher density at a continuous uniform rate.

The invention is further illustrated by the following examples. For these tests a heating oven and an immersion bath are employed. The heating oven has a slit in its floor through which the glass samples can be transferred into the immersion bath in two to three seconds. The immersion bath comprises a container two-thirds full of water and one-third full of oil.

Commercially available sodium silicate glass, also known as float glass or crystal mirror glass, is employed as representative of glasses with a high thermal stress coefficient. Borosilicate glass available from the Jenaer Glaswerk Schott and Gen. of Mainz, Germany, under the trade names DURAN and TEMPAX is employed as a glass having a low thermal stress coefficient of 0.25 N/(mm$^2$K). The hardening oil is that available from the British Petroleum Company as "CS32" and as "CS460". The hardening oil designated "CS32" has the lower viscosity. Samples having thicknesses of 2 and 5 mm in the case of borosilicate glass and 2 mm in the case of float case were selected.

EXAMPLE 1:

Prestressing of 2 mm Float Glass

Float glass having a thickness of 2 mm is heated in the heating oven at 690° C. for 2.5 minutes. It is then placed in the immersion bath in 2 to 3 seconds. The relationship between residence time in oil before the glass is placed in water and the degree of temper is shown in Table I.

TABLE I

| Immersion Bath | Thickness of Glass [mm] | Time in Oil [seconds] | Degree of Temper [N/mm$^2$] |
|---|---|---|---|
| CS 32 H$_2$O | 2 | 4 | 118 |
| CS 32 H$_2$O | 2 | 3 | 127 |
| CS 32 H$_2$O | 2 | 2.5 | 132 |
| CS 32 H$_2$O | 2 | 2 | 140 |
| CS 32 H$_2$O | 2 | 1.5 | Breaks |

The temper produced by the process is sufficient such that the samples break into fine grains upon mechanical destruction.

EXAMPLE 2:

Tempering of 2 and 5 mm thick Borosilicate glass

The glass is heated for 2.5 as well as 5.5 minutes at 740° C. in the heating oven and is transferred in 2 to 3 seconds into the immersion bath. In Table II the experimentally determined degree of temper is given in relationship to the residence time in oil before the glass comes into the water.

TABLE II

| Immersion Bath | Thickness of Glass [mm] | Time in Oil [seconds] | Degree of Temper [N/mm$^2$] |
|---|---|---|---|
| CS 32 H$_2$O | 2 | 0.5 | 103 |
| CS 32 H$_2$O | 5 | 0.5 | 102 |
| CS 460 H$_2$O | 2 | 0.5 | 100 |
| CS 460 H$_2$O | 5 | 0.5 | 103 Cracks in part |
| CS 32 H$_2$O + 5 Vol. % CH$_3$CH$_2$OH | 5 | 1-2 | 90 |
| CS 32 H$_2$O + 5 Vol. % CH$_3$CH$_2$OH | 5 | 0.5 | 99 |
| CS 32 | 5 | 0.1 | 99 |

TABLE II-continued

| Immersion Bath | Thickness of Glass [mm] | Time in Oil [seconds] | Degree of Temper [N/mm²] |
|---|---|---|---|
| $H_2O$ + 5 Vol. % $CH_3CH_2OH$ CS 32 + Vol. % $CCl_4$ | 2 | 2 | some cracks 72 |
| $H_2O$ + 5 Vol. % $CH_3CH_2OH$ CS 32 + 2 Vol. % CCl | 5 | 2 | 94 |
| $H_2O$ + Vol. % $CH_3CH_2OH$ CS 32 + 2 Vol. % CCl | 2 | ~0.1 | 103 some cracks |
| $H_2O$ + 5 Vol. % $CH_3CH_2OH$ CS 32 + 2 Vol. % CCl | 5 | 0.5 | 97 |
| $H_2O$ + 5 Vol. % $CH_3CH_2OH$ | | | |

What is claimed is:

1. A process for tempering glass consisting of the steps of:
   I. heating the glass to a temperature above the glass transformation temperature and below the softening temperature to produce heated glass; and then
   II. passing the heated glass into a liquid of lower density; and then
   III. passing the heated glass into a liquid of higher density;
   wherein the residence time of the glass in the liquid of lower density is long enough such that the glass does not crack upon entering the liquid of higher density but is not so long as to completely cool the glass; and
   wherein the liquid of lower density is immisible with the liquid of higher density and wherein both liquids are contained in a single vessel; and
   wherein the liquid of higher density is water.

2. The process of claim 1 wherein the liquid of higher density is an aqueous solution of water soluble organic solvents.

3. The process of claim 1 wherein the liquid of higher density is a mixture of alcohol and water.

4. A process for the tempering of thin borosilicate glass comprising, in sequence, the steps of:
   I. heating the glass to a temperature of 700° to 780° C. to produce heated glass; and then
   II. passing the heated glass into a hydrocarbon oil having a temperature of 10° to 40° C.; and then
   III. passing the heated glass into an aqueous solution containing two to 20% ethanol based upon the combined weight of ethanol and water;
   wherein a given portion of the surface of the glass remains in the oil for a time between 0.5 and 3 seconds before being brought in contact with the aqueous solution; and
   wherein the oil is immiscible with the aqueous solution; and
   wherein both liquids are contained in a single vessel; and
   wherein the oil has a density less than that of the aqueous solution such that the oil is present in a continuous layer floating on the top of the aqueous solution.

5. The process of claim 4 wherein the borosilicate glass has a thickness of 1 to 8 millimeters.

6. A process for the tempering of thin float glass comprising, in sequence, the steps of:
   I. heating the glass to a temperature of 650° to 730° C. to produce heated glass; and then
   II. passing the heated glass into a hydrocarbon oil having a temperature of 10° to 40° C.; and then
   III. passing the heated glass into an aqueous solution containing two to 20% ethanol based upon the combined weight of ethanol and water;
   wherein a given portion of the surface of the glass remains in the oil for a time between 0.5 and 3 seconds before being brought in contact with the aqueous solution; and
   wherein the oil is immiscible with the aqueous solution; and
   wherein both liquids are contained in a single vessel; and
   wherein the oil has a density less than that of the aqueous solution such that the oil is present in a continuous layer floating on the top of the aqueous solution.

7. The process of claim 6 wherein the float glass has a thickness of 1 to 4 millimeters.

* * * * *